United States Patent [19]

Eerdmans

[11] Patent Number: 5,381,752
[45] Date of Patent: Jan. 17, 1995

[54] PADDLE BOAT

[76] Inventor: Donald Eerdmans, 8181 Ash Dr., Jenison, Mich. 49428

[21] Appl. No.: 51,132

[22] Filed: Apr. 22, 1993

[51] Int. Cl.⁶ .......................................... B63H 16/20
[52] U.S. Cl. .................................. 114/270; 440/27; 440/90
[58] Field of Search ................ 114/270, 361; 440/26, 440/27, 90, 100, 30, 29; 74/594.4, 594.1; 280/231, 259

[56] References Cited

U.S. PATENT DOCUMENTS

| | | | |
|---|---|---|---|
| 780,835 | 1/1905 | Such | 114/270 |
| 2,084,373 | 6/1937 | Anderson | 74/594.4 |
| 2,578,535 | 12/1951 | Graci | 440/27 |
| 3,179,959 | 4/1965 | McDougall | 114/361 |
| 3,310,020 | 3/1967 | Slemmons | 440/100 |
| 4,597,353 | 7/1986 | Takezono | 114/270 |
| 4,668,196 | 5/1987 | Billmayer et al. | 440/26 |
| 4,979,916 | 12/1990 | LeBlanc | 440/27 |
| 5,016,558 | 5/1991 | Oehler | 114/361 |

FOREIGN PATENT DOCUMENTS

| | | | |
|---|---|---|---|
| 0112612 | 2/1941 | Australia | 440/27 |
| 0050860 | 4/1941 | France | 440/30 |

*Primary Examiner*—Sherman Basinger
*Attorney, Agent, or Firm*—Price, Heneveld, Cooper, DeWitt & Litton

[57] ABSTRACT

A paddle boat includes wheels at the sides of the boat. The paddle wheels have vanes and a central rim. The rim is used to propel the boat on land. The boat has seats in front of and behind peddles used to drive the wheels. The peddles have front and back faces which upwardly extend toward one another.

9 Claims, 10 Drawing Sheets

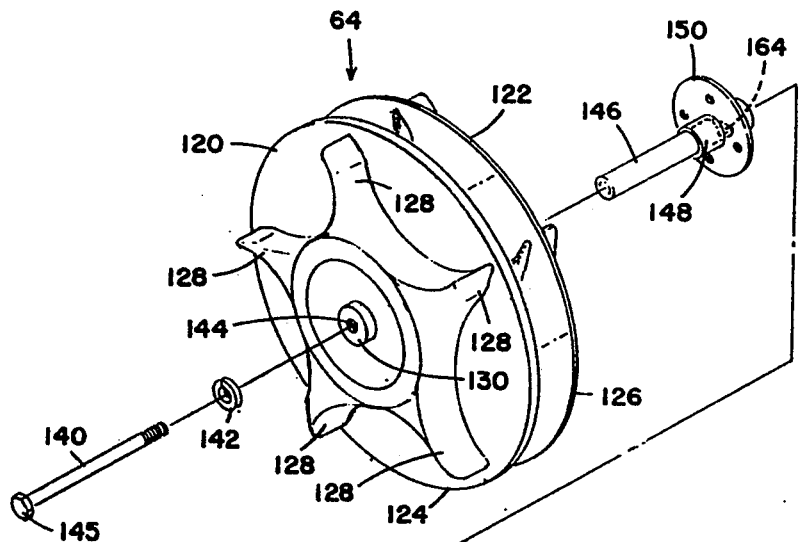
FIG. 14
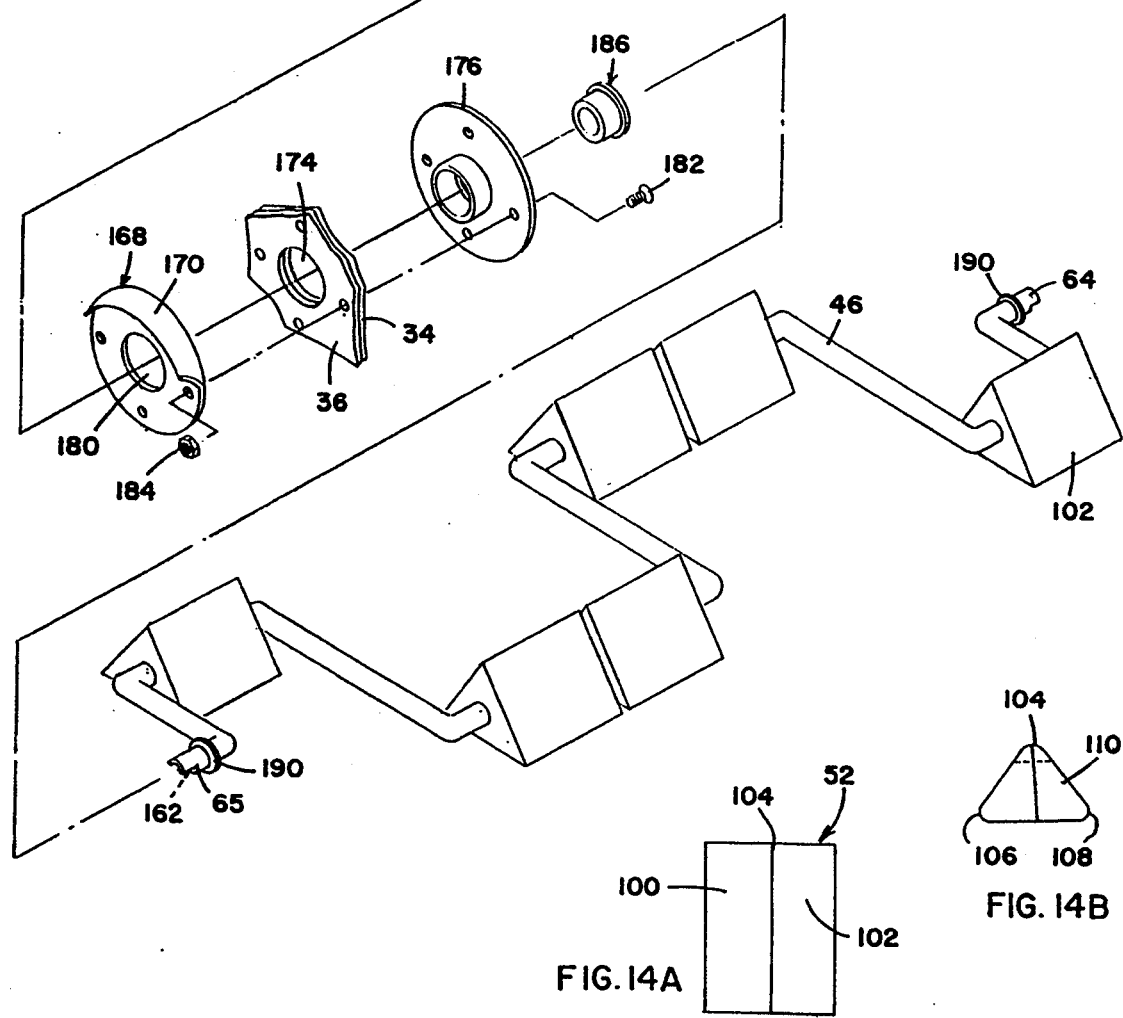
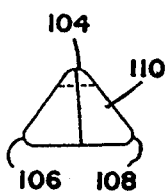
FIG. 14A
FIG. 14B

PADDLE BOAT

BACKGROUND OF THE INVENTION

The invention pertains to paddle boats, and more particularly paddle boats of the type including peddles pushed by riders to move a paddle which propels the boat through the water.

Small boats of the type including peddles, connected to a paddle, which an operator peddles to propel the boat through the water are well known. Despite the long time period over which these popular boats have evolved, it remains desirable to provide more versatile paddle boats which are easier to maintain and operate than those heretofore available.

One difficulty of known paddle boats is they are difficult to transport when they are out of the water. The paddles, which project outwardly to push the water, interfere with movement of the boat on land. Additionally, the paddles are typically flimsy, and thus easily broke if the boat is moved improperly on land, or when the paddle strikes underwater objects, such as logs and branches. The boats are relatively heavy and cumbersome and require a number of people to lift and transport them over land.

Another difficulty encountered with such paddle boats is they lack versatility in accommodating different numbers of occupants. Typically a paddle boat holds two occupants. Because the paddles are located in the middle of the boat, the two operators sit on opposite sides of the paddle, or above the paddle. When a single operator is in the boat, it is not balanced, and consequently will tilt to one side. If they did attempt to sit in the center, and thus straddle the paddle wheel, it is uncomfortable to the operator. If the operators are above the paddle, the height of the operator makes the boat top heavy, more cumbersome and is also uncomfortable to the operator. In either case, the users find the tilting of the boat to be annoying and unsafe, and consequently they will not use the boat unless they have someone to balance the weight distribution on the boat.

SUMMARY OF THE INVENTION

The present invention overcomes the difficulties of the prior art by providing a paddle boat which is versatile in use. The paddle boat is easily transported on land and efficient for use in the water.

According to one aspect of the invention, the paddle boat includes a hull having a longitudinal axis extending from the bow to the stern. A cockpit is provided in the hull. An axle extends through the cockpit. A pair of paddle wheels are coupled to the axle. Each of the paddle wheels includes vanes extending from a hub of the paddle wheel for propelling the paddle boat in the water, and an outer rim which circumscribes the vanes to provide a surface for contacting the ground, whereby the paddle wheel provides a propeller for the paddle boat in the water and a wheel for the paddle boat on land. The paddle wheels are positioned on opposite sides of the longitudinal axis.

According to another aspect of the invention, the paddle boat includes a seat positioned in front of the axle and a seat positioned behind the axle. Both of the seats face the axle, such that people sitting in the seats may peddle to move the axle and thus propel the wheels. According to still another aspect of the invention, the peddles include a front surface and a back surface. The front and back surfaces angle upwardly toward one another such that the front and back surface are positioned properly for people sitting in both of the seats.

According to yet another aspect of the invention, the paddle boat includes a round rudder. The round rudder provides a wheel for the stern of the boat, and facilitates transportation of the paddle boat on land, as well as steering the boat in the water.

According to one other aspect of the invention, the paddle boat includes a storage compartment adjacent the cockpit. A rigid member is movably supported on the hull of the paddle boat such that it may be lowered to a position covering the compartment or lifted to a position at least partially covering a person in the cockpit.

The paddle boat according to the invention is versatile in accommodating different numbers of occupants. Additional versatility is provided by the canopy which serves as both a cover for the storage compartment and a canopy for occupants of the boat. The paddle wheels on the boat provide a durable propeller and facilitate transportation of the boat on land.

These and other features, objects and advantages of the present invention will become apparent upon reading the following description thereof together with reference to the accompanying drawings in which:

BRIEF DESCRIPTION OF THE DRAWINGS

FIG. 14 is an exploded perspective view of an axle, peddle, and wheel assembly for the boat according to FIGS. 1-13;

FIG. 14a is a top plan view of a peddle;

FIG. 14b is a side elevational view of the peddle of FIG. 14a;

DESCRIPTION OF THE PREFERRED EMBODIMENTS

Figure 8:
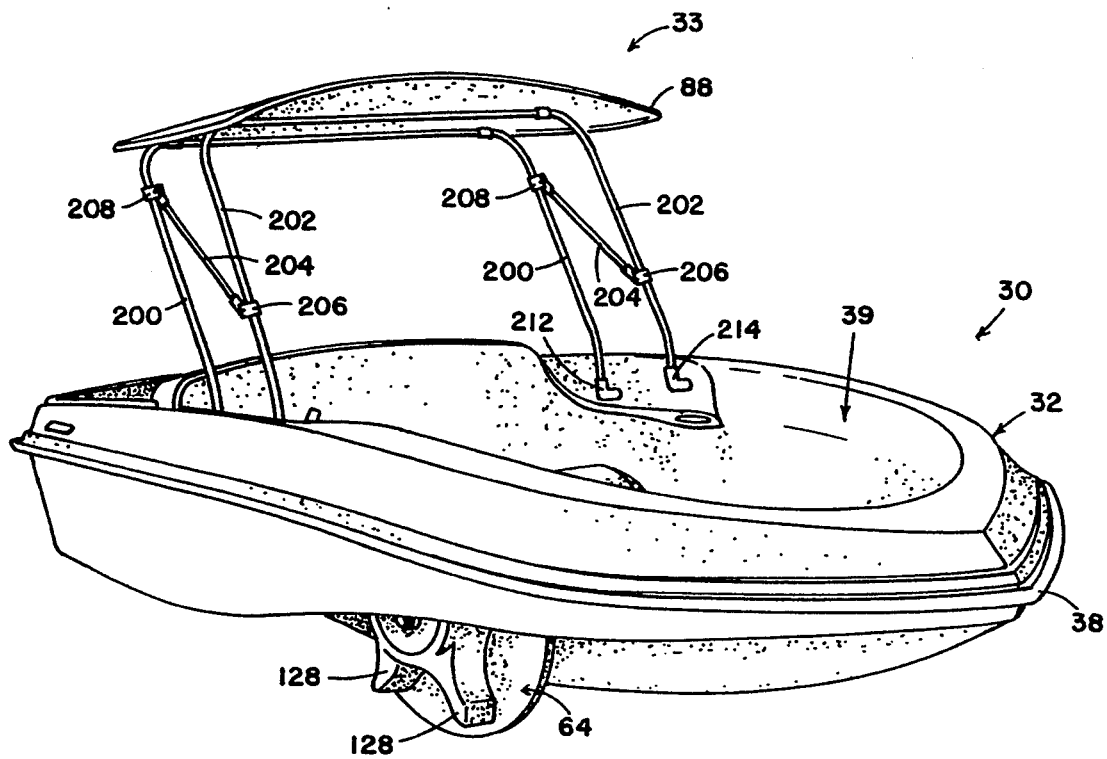
FIG. 8 is a front elevational view of the paddle according to FIG. 1 with the rigid member in the canopy position.
Figure 1:
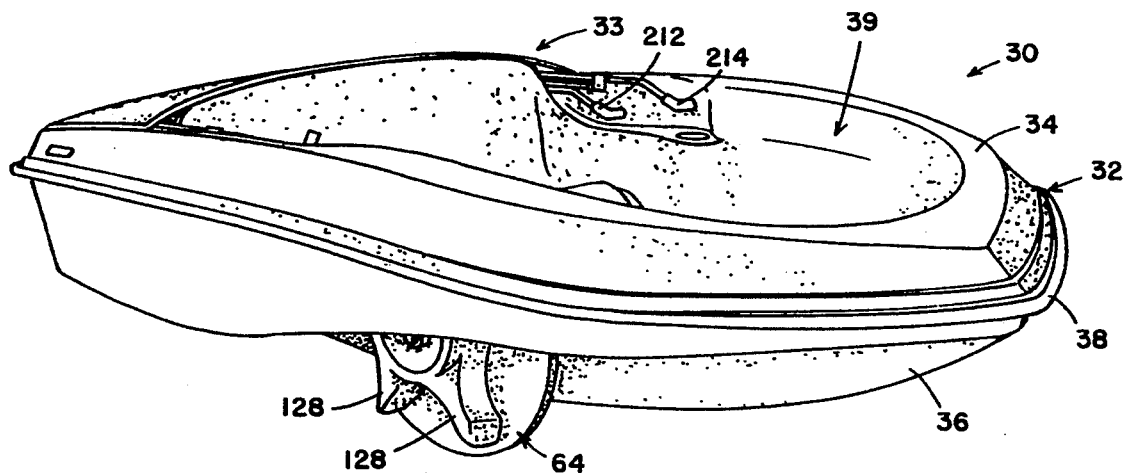
FIG. 1 is front perspective view of a paddle boat according to the invention.
Figure 9:
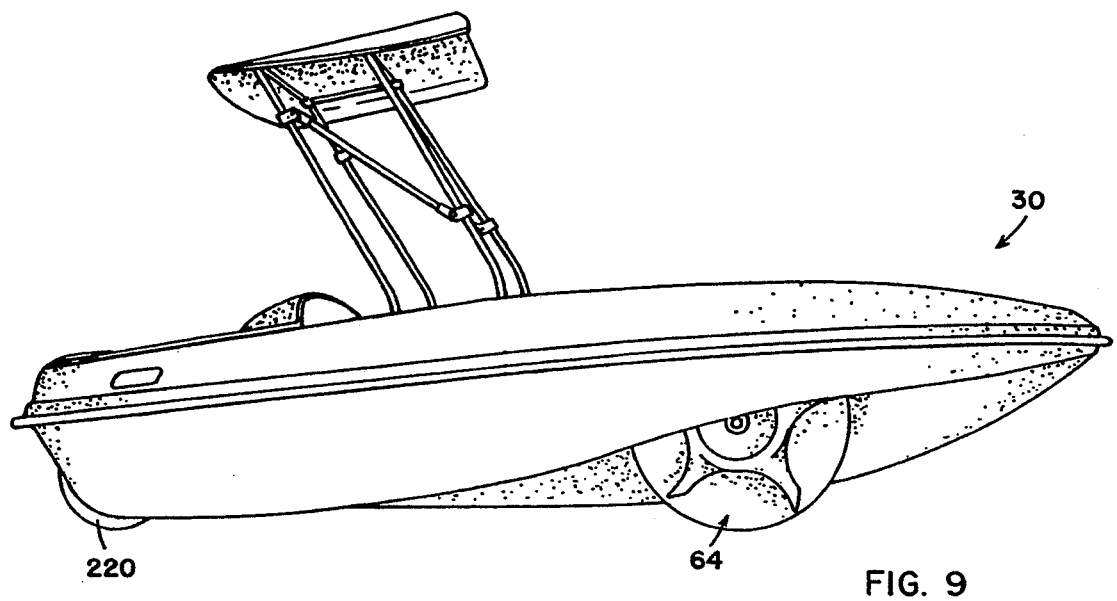
FIG. 9 is a front elevational view of the paddle boat according to FIG. 8.
Figure 2:
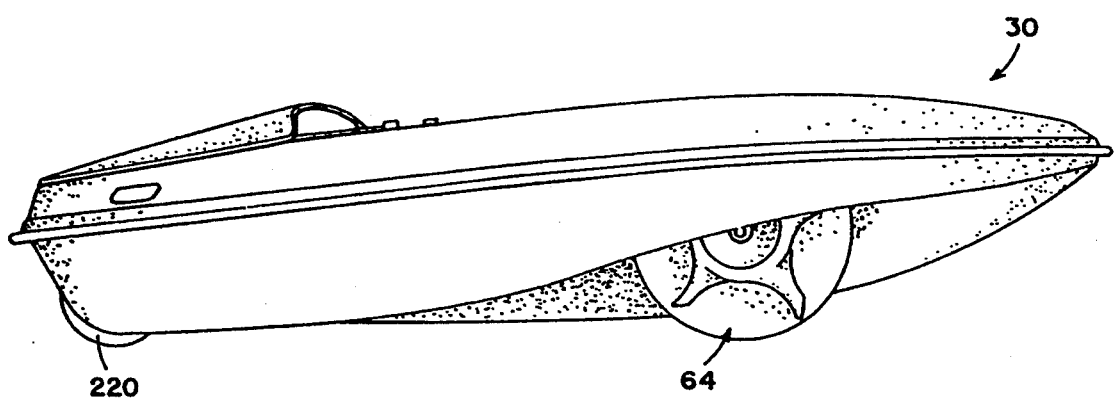
FIG. 2 is a front elevational view of the paddle boat according to FIG. 1.
Figure 10:
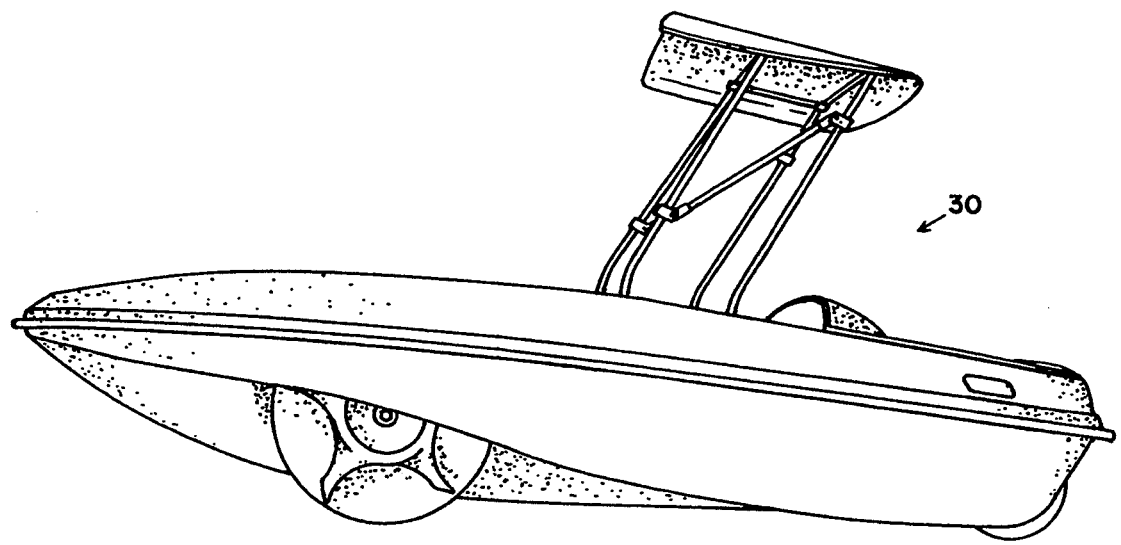
FIG. 10 is a right side elevational view of the paddle boat according to FIG. 8.
Figure 3:
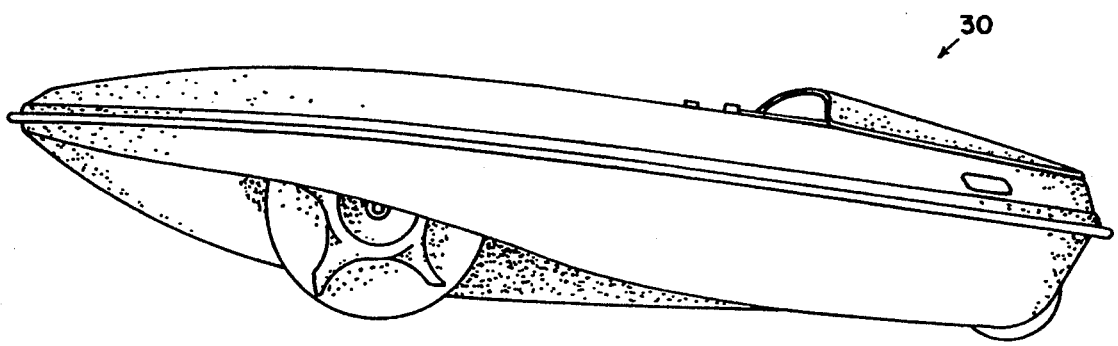
FIG. 3 is a right side elevational view of the paddle boat according to FIG. 1.
Figure 7:
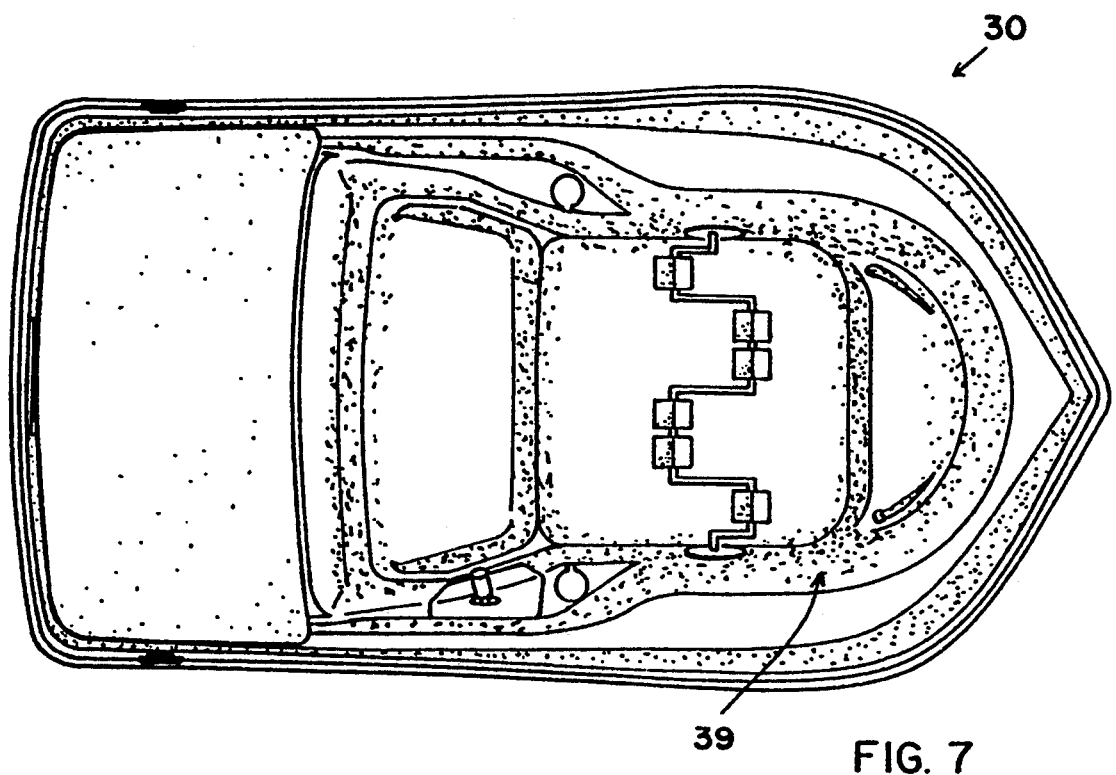
FIG. 7 is a top plan view of the paddle boat according to FIG. 1.
Figure 3A:
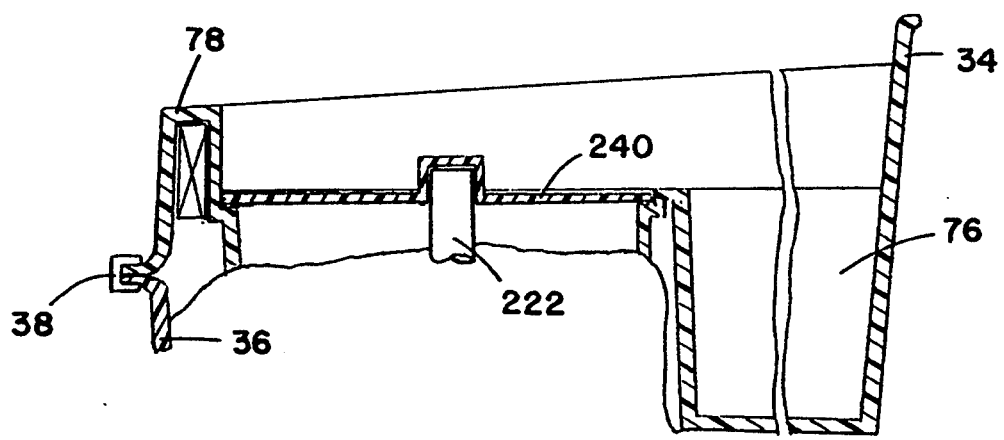
FIG. 3a is a fragmentary sectional view of the stern of the boat according to FIG. 3.
Figure 11:
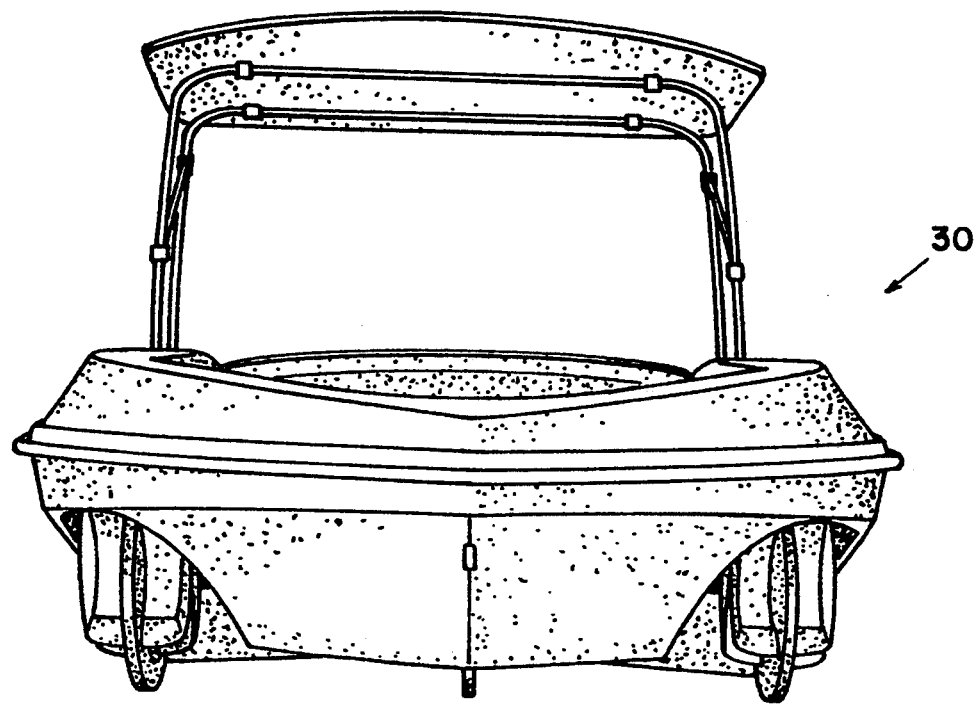
FIG. 11 is a left side elevational view of the paddle boat according to FIG. 8.
Figure 4:
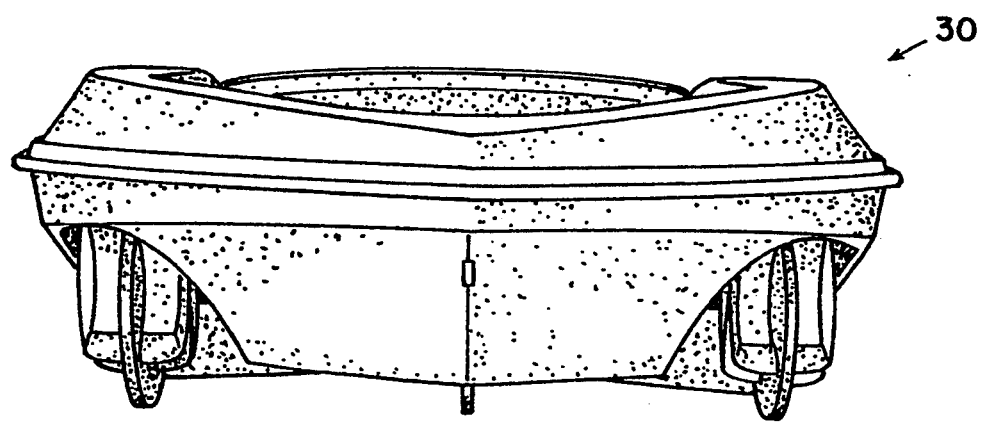
FIG. 4 is a left side elevational view of the paddle boat according to FIG. 1.
Figure 12:
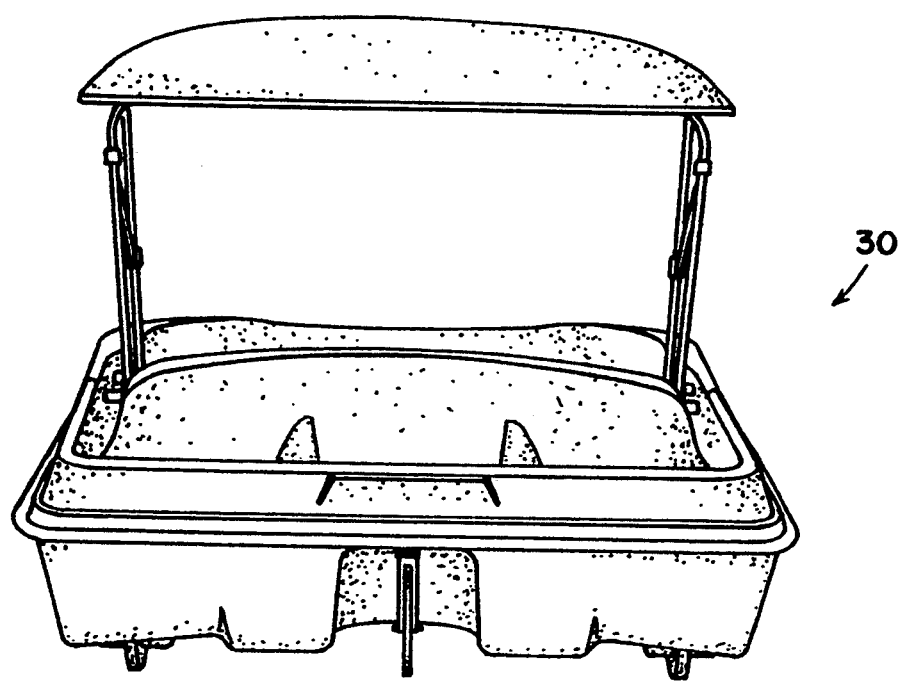
FIG. 12 is a rear elevational view of the paddle boat according to FIG. 8.
Figure 5:
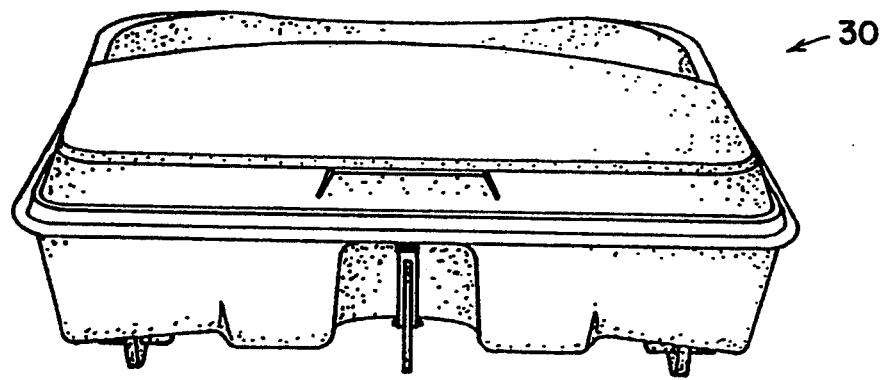
FIG. 5 is a rear elevational view of the paddle boat according to FIG. 1.
Figure 13:
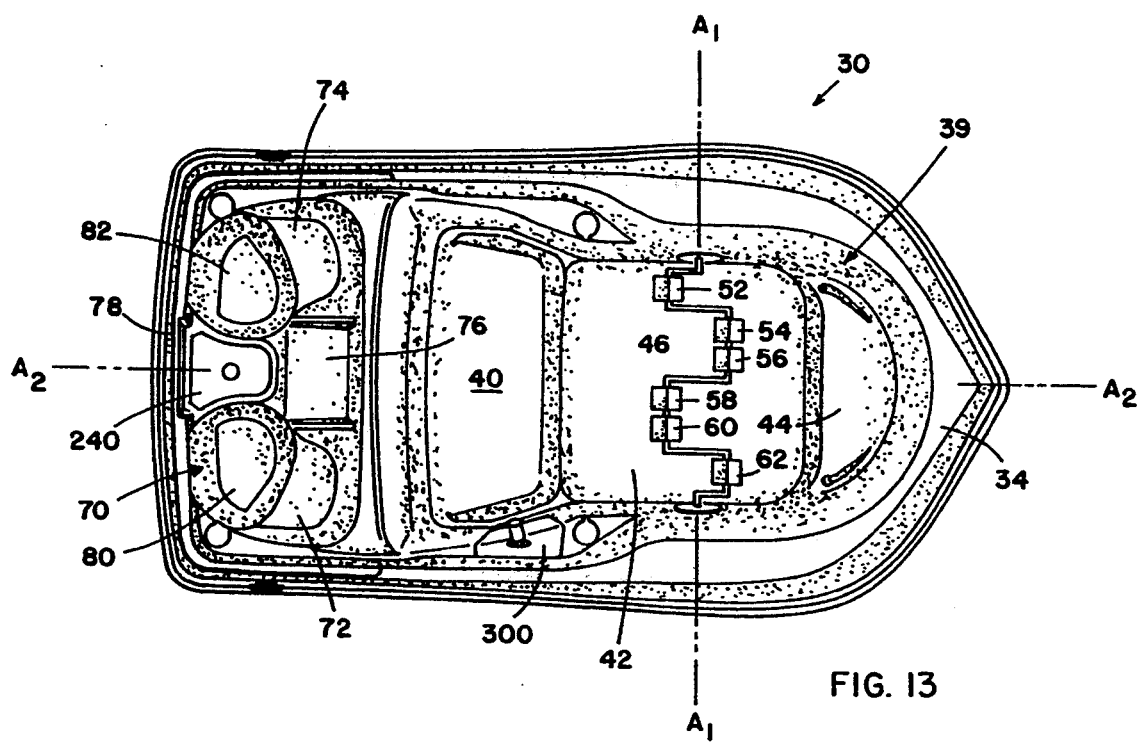
FIG. 13 is a top plan view of the paddle boat according to FIG. 8 with the rigid member removed to show the entire deck.
Figure 6:
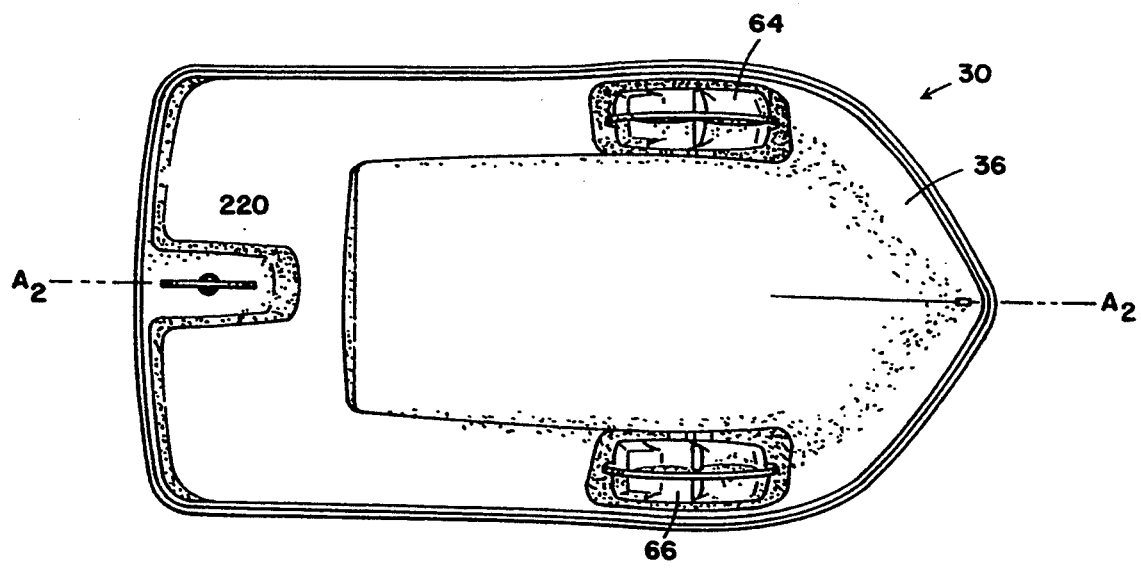
FIG. 6 is a bottom plan view of the paddle boat according to FIG. 1.

A paddle boat 30 according to the invention is illustrated in FIGS. 1'13. Paddle boat 30 includes a hull 32 and a moveable member 33 pivotally supported on hull 32. Hull 32 includes a deck 34 and a bottom 36 which are interconnected by suitable, conventional means. An edging 38 circumscribes deck 34 at the joint of hull 32 and bottom 36. Edging 38 is preferably provided of a suitable rubber material, such that it provides a bumper for hull 32. Hull 32 further includes a cockpit 39 for passengers in boat 30. As best illustrated in FIG. 7, cockpit 39 includes a seat 40 and a seat 44 facing one another. A generally rectangular footwell 42 is positioned between seats 40 and 44. An axle 46 extends between side walls 48 and 50 of cockpit 39. An axle 40 carries pedals 52, 54, 56, 58, 60 and 62. Paddle wheels 64 and 66 are mounted to opposite ends 65 (FIG. 14) and 67, respectfully, of axle 46. The wheels are supported on axle 46 such that rotation of the axle causes rotation of the wheels to propel paddle boat 30 through water.

Boat 30 further includes a compartment 70 positioned in the stern of boat 30. Compartment 70 includes seats 72 and 74. A battery well 76 is positioned between seat 72 and 74. A motor mounting 78 is also provided on the stern of boat 30. A motor (not shown) attached to motor mounting 78 may be connected to a battery (not shown) in battery well 76. A footwell 80 for seat 72 and a footwell 82 for seat 74 are also provided in compartment 70. Compartment 70 is closed by a rigid member 88 of movable member 33. Rigid member 88 may be moved to a canopy position, as illustrated in FIGS. 8-13, wherein the rigid member 88 is supported by frame 90.

Somewhat more particularly, hull 32 includes a deck 34 and bottom 36 as described briefly above. Deck 34 and bottom 36 are preferably made of a Ultraviolet-stabilized high-density polyethylene, but could be made of any suitable material such as fiberglass, wood or the like. The deck 34 and bottom 36 are attached by suitable means such as staples, an adhesive, or the like. Edging 38 covers the joint between deck 34 and the bottom 36 to help seal the joint against moisture and to provide an attractive appearance. The edging 38 is preferably made of a rubber-like substance such that it provides a bumper for the boat.

Cockpit 39 and compartment 70 are preferably integrally formed as part of deck 34. A suitable material (not shown) is preferably positioned between the seats of cockpit 39 and bottom 36 and between compartment 70 and the bottom member 36, to provide rigid, solid seats for the boat. The material is provided by any suitable flotation material.

As mentioned briefly above, cockpit 39 (FIG. 13) includes seat 40, which is positioned behind axle 46 and seat 44 which is positioned in front of axle 46. Seat 40 is large enough to hold two large adults or 3 medium size children. Seat 44 is positioned in front of axle 46, and is for receipt of a child. Preferably, seat 44 is closer to the rotation axis A1 of axle 46 than seat 40. Accordingly, two adults sitting in seat 40 and a child sitting in seat 44 will be able to comfortably reach the axle.

The six pedals 52, 54, 56, 58, 60 and 62 are mounted to axle 46 to accommodate the different seating arrangements permitted by seats 40 and 44. If two adults are sitting in seat 40, each adult will use the respective pedals. For example, the person sitting on the port side of the boat may use pedals 52 and 54. An adult sitting on the starboard side of seat 40 may use pedal 60 and 62. If three children are sitting in seat 40, the middle child will use pedals 56 and 58. If a child is sitting in seat 44, the child may use pedals 56 and 58. If a single passenger is operating boat 30, that passenger would use pedals 56 and 58.

Pedals 52, 54, 56, 58, 60 and 62 are identical, and accordingly, only pedal 52 will be described in greater detail hereinafter. Pedal 52 is illustrated as having a front face 100 and a rear face 102. It is envisioned that the pedals be provided by a body having a profile which is in the form of an equilateral triangle, whereby any one of the three longitunal surfaces of the peddle can be used by one operator or any two surfaces may be used by opposite operators to move the axle. Both faces 100 and 102 are angled toward one another such that they converge at top edge 104. Preferably, top edge 104 as well as the lower edges 106 and 108 are curved. It is also envisioned that the top of the pedal may be flat, as is illustrated by phantom line 110 in FIG. 14b. Irrespective of the profile of the pedal, front 100 faces seat 40 and back 102 faces seat 44. Because both faces positioned for use by operators slope upwardly away from the associated seats, the pedals are angled for comfortable, secure peddling regardless of which seat or seats the peddlers are in. It should be noted that pedals 54 and 56 may be provided by a single pedal having a double width. Similarly, pedals 58 and 60 may be provided by a single pedal having a double width. However, in the preferred embodiment, pedals 52, 54, 56, 58, 60 and 62 are identical to facilitate production by limiting the number of variation in parts which must be made for the boat.

Compartment 70 is positioned behind the cockpit and includes motor mounting 78 and battery well 76 as described briefly above. Motor mounting 78 allows a small electric or gas operated motor to be attached to the back of the paddle boat. The motor mount preferably includes an internal 2×4 79 to provide a rigid support for the motor and prevent twisting or flexing of the decking to which the motor is clamped.

Figure 15:
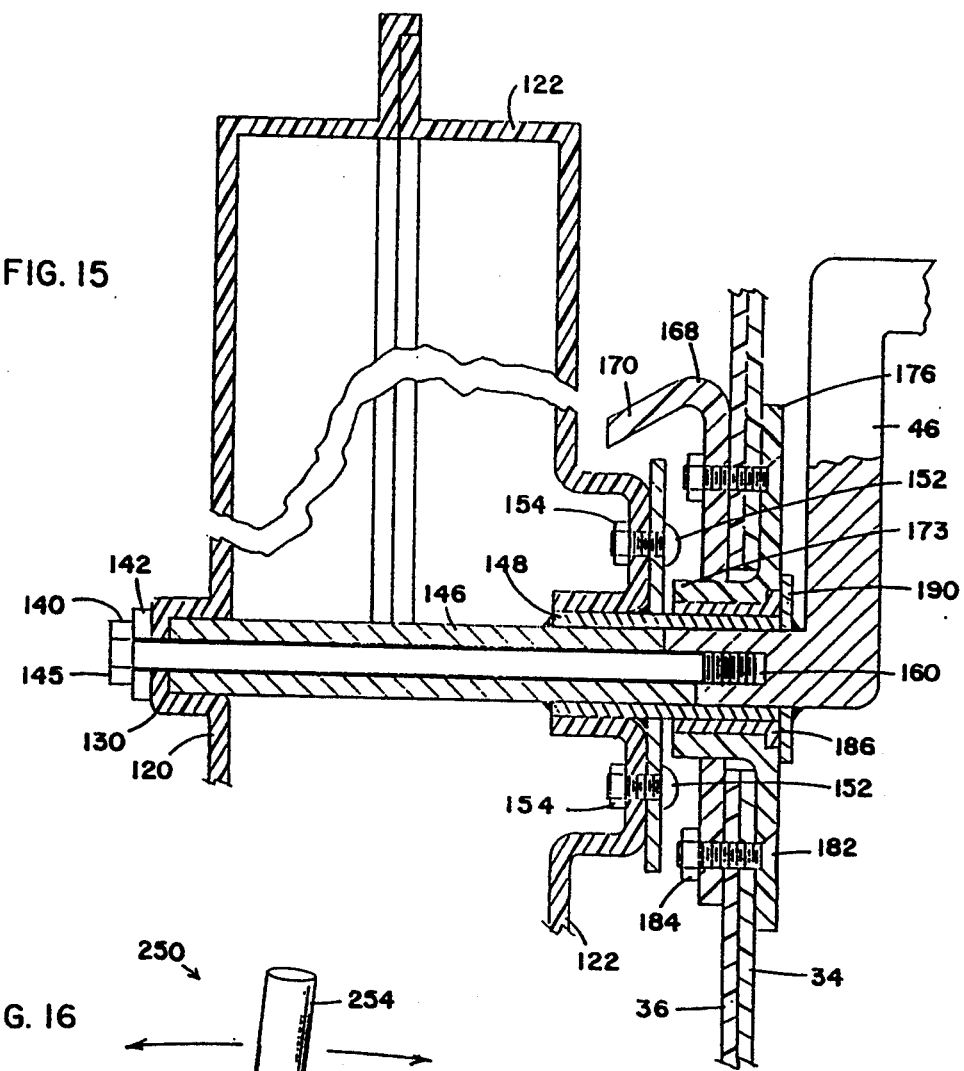
FIG. 15 is a fragmentary cross sectional view of the axle and wheel assembly of FIG. 14.
Figure 16:
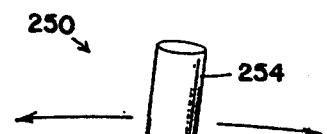
FIG. 16 is a fragmentary perspective view of a handle for controlling the rudder of the paddle boat according to FIGS. 1-13.
Figure 17:
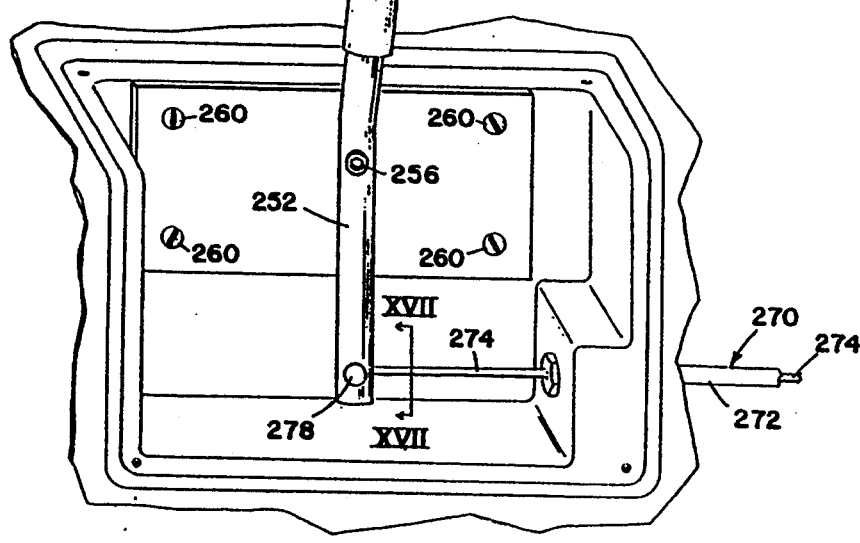
FIG. 17 is a fragmentary elevational view of a handle and cable connection according to 16.

Paddle wheels 64 and 66 are positioned on opposite sides of the paddle boat. The paddle wheels are identical, and thus only paddle wheel 64 will be described in greater detail hereinafter. The paddle wheel 64 includes two wheel sections 120 (FIG. 14) and 121 which are integrally molded of a surface polymer. The wheel sections each include rims 124 and 126, respectively. Vanes 128 extend outwardly from a central hub 130. Sections 120 and 122 are preferably substantially identical, except that section 120 is larger than section 122. Section 122 may thus be received within section 120. Section 120 thus provides the ground contacting surface of the wheel, and section 122 supports the portion of rim 124 which overlaps section 120, as best illustrated in FIG. 15. Alternatively, section, 120 and 122 may have an identical diameter. However, the preferred embodiment provides additional durability for the rims of the wheel. Vanes 128 of sections 120 and 122 extend outwardly from a central plane which bisects the paddle wheel. Preferably rim 124 and 126 are centrally located such that the vanes on both sides of the rim project an equal distance from the bisecting plane of the wheel. However, the vanes associated with each of the sections could have different widths. Sections 120 and 122 or connected by any suitable means, such as fasteners, an adhesive, or the like. The interior of the wheel is hollow to reduce the wait of the wheel.

As described above, the wheel is attached to the axle such that the wheel rotates therewith. The wheel mounting assembly illustrated in FIGS. 14 and 15 is utilized to attach wheels to the axle. The wheel attachment assembly includes a bolt 140 for insertion through aperture 144 in central hub 130. A washer 142 is positioned between central hub 130 and a head 145 of bolt 140. A cylinder 146 is received snugly within hub 130. Cylinder 146 is welded to a cylinder 148. Cylinder 148 is in turn welded to a disk 150. Cylinder 146, cylinder 148 and disk 150 are formed of any suitable material such as steel. Disk 150 is attached to section 122 using bolts 152 and nuts 154. Disk 150 will thus rotate with wheel 64. The bolt 140 is received within a central threaded aperture 160 of axle 46. As illustrated in FIGS. 14 and 15, the cylinder 146 and axle 46 are preferably notched at 162 and 164, respectively, such that the cylinder 146 and axle 162 are interlocked to rotate together. Cylinder 148 provides a solid support where cylinder 146 and axle 162 interlock.

The assembly further includes a drip plate 168 including a lip 170 to push water lifted by wheel 64 into a channel formed between section 122 and disk 150. Water lifted by the wheel will thus flow away from aperture 174 in the hull to help prevent water from flowing into the interior of the boat. Drip plate 168 is constructed of any suitable material such as a plastic. An inner sealing plate 176, including a rim 178, is positioned within the cockpit and extends through aperture 174 in hull 32 and an aperture 180 in drip plate 168. Inner sealing plate 176 is constructed of any suitable material such as plastic or aluminum. The deck 36 and hull 34 are clamped between the drip plate 168 and inner plate 176 by bolts 182 and the nuts 184. A nylon collar 186 is positioned between inner plate 176 and cylinder 148 to provide a low friction member positioned between the parts fixedly secured to the hull of the boat and the parts which rotate with the wheel axle.

The moveable member 33 includes a rigid member 88 which closes compartment 70 in a cover position, illustrated in FIGS. 1-5 and 7, and provides a canopy for people in seat 40 in a canopy position illustrated in FIGS. 8-13. The rigid member 88 is preferably constructed of the same material as deck 34, such that it has the same appearance as deck 34. The rigid member 88 is supported by frame 90, which includes two generally U-shaped column members 200 and 202. The column members 200 and 202 are preferably constructed of a hollow aluminum cylindrical members which are light weight and will not deteriorate with age. Members 200 and 202 are connected by pivoting links 204. Each end of each of links 204 pivot on a respective clamping member 206 and 208. Clamping members 206 or clamping members 208 are fixedly engaged to one of columns 200 and 202. The other clamping members releasably engage the other one of columns 200 and 202, such that it slides when the moveable member is opened and closed. The linking members provide rigidity for the frame such that member 88 is securely supported in the canopy position illustrated in FIGS. 8-13. It is also envisioned that the linking members could be provided by gas cylinders (i.e., gas springs).

The ends of columns 200 and 202 are supported in respective pivot holders 212 and 214. The pivot holders 212 and 214 rotate on side walls 48 and 50 to permit rotating of the columns to move the rigid member between the cover position and the canopy position. The pivoting members preferably include a locking element which secures the rigid member in the upright position, and may be disengaged to move the rigid member back to the cover position. The pivot holders are preferable removable attached to the side walls such that the pivot holders and columns may be removed from the boat if the operators do not wish to have a canopy or a cover on the boat. The pivot members may be provided by any suitable, conventional pivoting, locking, removably attached device.

Figure 18:
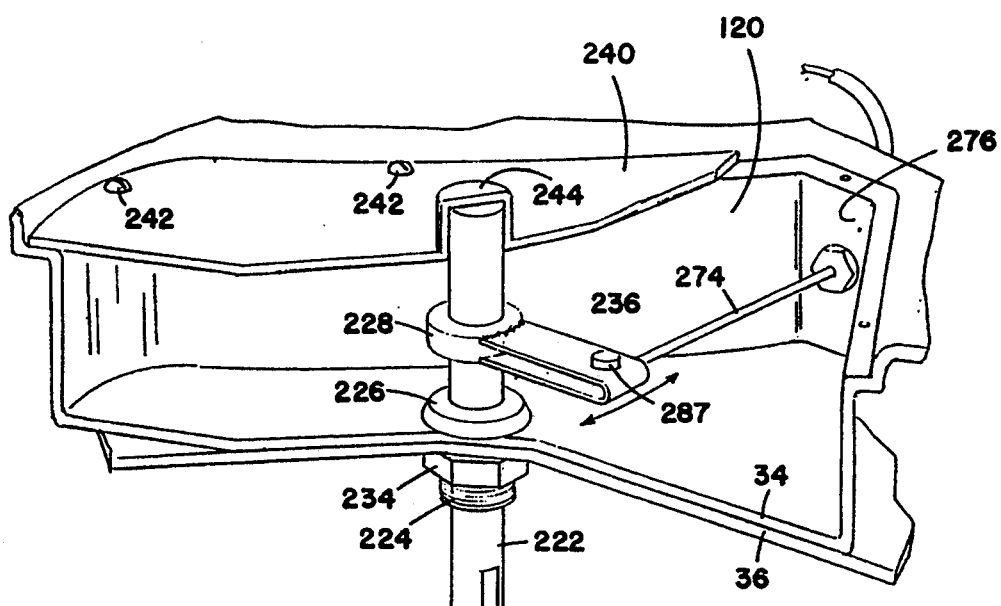
FIG. 18 is a perspective view of the rudder assembly and a fragmentary view of the boat according to FIGS. 1-13.

The ruder 92 is preferably provided by a round disk as illustrated in FIG. 18. Disk 92 is constructed of any suitable material such as an organic polymer. The disk is supported by a rod 222 which extends upwardly through bottom 36 and deck 34 at the stern of the boat. The column 222 is slotted to receive a radius of the disk. The center of the disk is attached to an axle 224. The column 220 rotates around axle 224 when the boat is on land. The column 222 includes three weldments. A first weldment is an outside threaded cylinder 224. A second weldment is a disk 226. A third weldment is a disk 228. When the ruder is inserted through deck 34 and bottom 36, column 222 is pressed downwardly until weldment 226 engages deck 34. A nut 234 is fastened to threaded member 224 and tightened such that the deck and hull are positioned securely between nut 224 and weldment 226. A bracket 228 is welded to weldment 228. Bracket 228 is used to steer the ruder as described in greater detail hereinafter. A ruder plate 240 is secured to deck 34 and encloses the housing 120. The ruder plate 240 is secured using fasteners 242. Plate 240 includes a silo 244 which receives a distal end of column 222, and secures the column against wobbling.

The paddle boat includes a steering mechanism 250 positioned on the starboard side of the paddle boat. Steering mechanism 250 includes a cylindrical lever 252 having a handle 254 positioned thereon. Lever 252 pivots around an axle which is secured in a wall plate 258. Wall plate 258 is secured to deck 34 using any suitable, conventional fasteners 260. The steering mechanism 250 and the ruder are connected by a cable 270. Cable 270 is provided by a conventional cable of the type including an outer sheathing and an inner wire 274. Sheathing 272 is securely attached at one end to wall 274 and at the other end to a wall 276 in rudder housing 120. End 278 is secured to lever 252. The other end 282 of wire 274 is secured to bracket 236. Wire 274 slides within sheathing 272 such that movement of the lever forward and backward moves column 22 clockwise and counter-clock wise.

Figure 19:
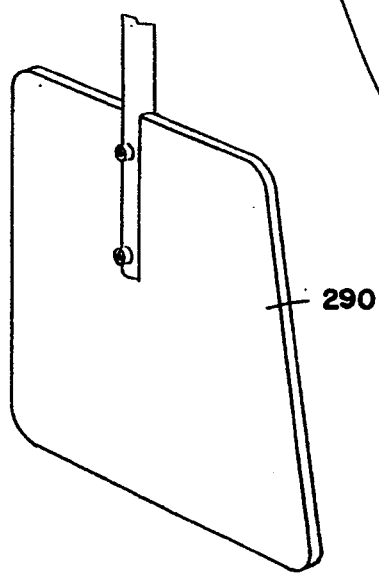
FIG. 19 is a perspective view of an alternate embodiment of the rudder.
Figure 20:
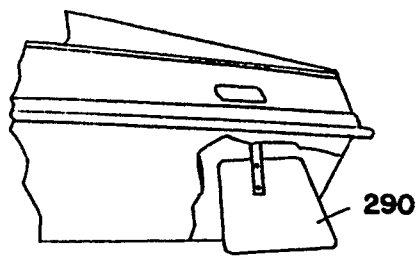
FIG. 20 is a fragmentary side elevational view of the boat according to FIGS. 1-13 with the rudder according to FIG. 19.

According to an alternate embodiment of the invention, the rudder is provided by a four sided, generally rectangular member 290 (FIGS. 19 and 20). Rudder 290 is provided if the rudder is not to be used as a third wheel.

To assemble hull 32, deck 34 and bottom 36 are connected by any suitable means such as staples, an adhesive, or the like. Edging 38 is then attached to hull 32 where the deck and bottom are joined. Collar 186 (FIGS. 14 and 15) is inserted into inner plate 176, which is inserted into apertures 174 in walls 48 and 50. The axle 46 is inserted through the central aperture of collar 186 associated with side wall 48. Side wall 50 is pressed inwardly, and the axle is moved into the collar 186 of associated side wall 50. The side walls are sufficiently flexible and resilient that when one end of the axle is inserted in one side wall, the other side wall may be pressed inwardly to move the axle into the aperture in the other wall. The side walls will then flex back, such that inner plates 176 abut with disks 190 welded on both ends of the axle. Holes are drilled through plates 168, the hull, and plate 176 for receipt of fasteners 182. The drip plate 168 is then secured to plate 176 using threaded fasteners 182 and 184.

Both wheels are assembled to the axle in the same manner. Accordingly, only the assembly of wheel 64 to axle 46 is described. Wheel 64 is secured to disk 150 using threaded fasteners 152 and 154. Cylinder 146 and cylinder 46 positioned in abutting, interlocking engagement. Cylinder 148 is slid over cylinder 146 and axle 46. The wheel and cylinders are locked to axle 46 using bolt 140, with washer 142 inserted between head 145 and the wheel hub 130. In this manner the wheels are attached to the axle such that they will rotate with the axle.

Prior to assembly of the hull, cable 271 is connected to walls 274 and 276 by conventional means, such that the sheathing 272 is secured at both ends. After the deck is attached to the bottom 36, rudder 92, column 222 which is inserted through the aperture in the ruder housing 120. Column 22 is secured to housing 120 by nut 234. Plate 258 is secured to the deck within the steering mechanism housing using fasteners 260. Lever 252 is then attached to the plate and end 278 of wire 274 is attached to the lever. The other end 282 of wire 274 is attached to bracket 236. A steering mechanism cover 300 is secured over the steering mechanism housing using conventional fasteners. The rudder plate 240 is secured over the ruder housing 120 using conventional fasteners. The rudder 220 is secured to column 222 at that time if it was not already attached. The pedals are secured to axle 46 by any suitable means. For example, the peddles may have a conventional bearing system of the type used with bicycle pedals. The pedals are preferably formed in two halves or three sections. The sections are attached over axle 46 such that they circumscribe the axle when assembled using conventional fasteners.

The moveable member 33 is then attached to the side walls of the cockpit. As discussed above, the movable member may be readily attached to and removed from hull 32.

In operation, one, two, or three peddlers are seated in seats 40 and 44. Two children may be positioned in compartment 70 if the canopy is removed or in the upright position. The peddlers used pedals 52, 54, 56, 58 60 and 62 to drive the axle and wheels which move the boat through the water. When the boat is out of the water, wheels 64 and 66, as well as rudder 220, are used to push the boat without lifting it. The lever 250 is used to move wire, which moves rudder 220 to steer the boat.

Accordingly, it can be seen that a paddle boat is disclosed providing versatility in the number of peddlers and riders which may use the boat. Additionally, a rear compartment is disclosed which may be used for a storage compartment or to allow additional passengers in the boat. The storage compartment includes a cover which doubles as a canopy. The paddles and rudders are also wheels. The boat is therefor versatile and easy to operate. It will become apparent to those skilled in the art that various additional modifications to the preferred embodiment of the invention as described herein can be made without departing from the spirit or scope of the invention as defined by the appended claims.

The embodiments of the invention in which an exclusive property or privilege is claimed are defined as follows:

1. A paddle boat, comprising:
   a hull, said hull having a longitudinal axis extending from the bow to the stem of the paddle boat, said hull having a deck and a bottom;
   a cockpit defined by said deck;
   an axle extending through said hull such that it extends into said cockpit;
   pedals carried on said axle, said pedals positioned in said cockpit;
   a sealing assembly extending through said hull and said deck, said axle extending through said sealing assembly, said sealing assembly including a sealing member and a drip plate assembled to said hull;
   pedaling positions in said cockpit including at least one seat spaced from said axle such that a person sitting in said seat can use said pedals to move said axle, said pedaling seat positions including a first seat positioned in front of said axle and a second seat positioned behind said axle, both of said first and second seats facing said axle such that people sitting in said first and second seats may use said pedals to move said axle to propel said wheels;
   said pedals including a front face and a back face, said front and back faces angled toward one another such that the front and back faces are angled upwardly for use by people sitting in either of said seats;
   paddle wheels coupled to opposite ends of said axle, each of said paddle wheels including vanes extending from a hub of said paddle wheel for propelling the paddle boat in the water, said vanes extending laterally from opposite sides of a planar portion of each said wheel, and an outer rim which circumscribes said vanes and provides a surface for contacting the ground, each said wheel including two halves which are interconnected to form each said wheel, and each of said halves including said vanes, and at least one of said halves including said rim integrally formed with said associated vanes, whereby said paddle wheels provide a propeller for the paddle boat in the water and a wheel for the paddle boat on land, said paddle wheels positioned on opposite sides of said longitudinal axis;
   a rudder, said rudder being round to provide a third wheel for the stern of the paddle boat to facilitate transportation of the paddle boat on land and steering the boat in the water;
   a storage compartment adjacent said cockpit, said compartment having sides and a bottom; and
   a rigid member movably supported on said hull such that it moves between a lowered position enclosing said compartment and a lifted position at least partially covering a person sitting in said cockpit.

2. A paddle boat, comprising:

a hull having a longitudinal axis;

an axle carded on said hull and extending across said boat;

a set of pedals carried on said axle;

at least two paddle wheels carried on said axle and positioned on opposite sides of said longitudinal axis of said boat, said paddle wheels including vanes extending from a hub of said paddle wheels for propelling the paddle boat in the water, and an outer rim which circumscribes said vanes and provides a surface for the ground whereby said paddle wheels each provide a propeller for the paddle boat in the water and a wheel for the paddle boat on land, said vanes extending laterally outwardly from opposite sides of a planar portion of said wheel, said rim positioned in the center of said wheel and said vanes extending outwardly therefrom, said rim and said vanes being integrally formed, and said wheel including two integral halves which are interconnected to form said wheel, and wherein an outer perimeter of one of said halves overlaps an outer perimeter of the other one of said halves such that the outer perimeter of said one of said halves provides the outer surface contacting portion of said wheel;

a deck on said hull, said deck having a seat positioned in front of said axle and a seat positioned behind said axle, both of said seats facing said axle such that people sitting in said seats may pedal to rotate said axle and thereby to propel said wheels;

said pedals including a front face and a back face, said front and back faces angled toward one another such that the front and back surfaces are angled upwardly for ready access by people sitting in both of said seats;

a rudder, said rudder being round to provide a wheel for the stern of the boat to facilitate transportation of the paddle boat on land and steering the boat in the water;

a storage compartment adjacent said cockpit, said storage compartment including four sides and a bottom; and a rigid member movably supported on said hull such that it may be lowered to a position enclosing said compartment or lifted to a position over a person in said cockpit.

3. A paddle boat, comprising:

a hull, said hull having a longitudinal axis extending from the bow to the stern of the paddle boat;

a cockpit;

an axle extending through said cockpit;

at least one .paddle wheels coupled to said axle;

pedals carried on said axle, said pedals positioned in said cockpit;

a first pedaling position in said cockpit, said first pedaling position including a first seat in said cockpit positioned in front of said axle; and a second pedaling position in said cockpit, said second pedaling position including a second seat in said cockpit positioned behind said axle, said first seat and said second seat disposed sufficiently close to said axle such that people sitting in each of said seats can simultaneously reach and access said pedals with their feet;

each of said pedals having a front surface and a back surface on opposite sides of said axle, and wherein said pedals have a substantially triangle shaped profile, such that said front surface and said back surface both face generally upwardly for people in said first seat and said second seat with said front surface generally facing said first seat and said back surface generally facing said second seat, said pedals being oriented and dimensioned so that a person seated on said first seat and a person seated on said second seat may simultaneously step on and pedal said pedals.

4. The paddle boat as defined in claim 3, further comprising a plurality of said paddle wheels and wherein said paddle wheels include vanes extending from a hub of said paddle wheels for propelling the paddle boat in the water, and an outer rim which circumscribes said vanes and provides a surface for contacting the ground, whereby said paddle wheels provide a propeller for the paddle boat in the water and a wheel for the paddle boat on land, said paddle wheels positioned on opposite sides of said longitudinal axis.

5. A paddle boat, comprising:

a hull, said hull having a longitudinal axis extending from the bow to the stern of the paddle boat, said hull having a deck and a bottom;

a cockpit defined by said deck;

an axle extending through said hull such that it extends into said cockpit;

pedals carried on said axle, said pedals positioned in said cockpit;

a sealing assembly extending through said hull and said deck, said axle extending through said sealing assembly, said sealing assembly including a sealing member and a drip plate assembled to said hull, said sealing member including a central cylinder and a projecting flange, and said drip plate including a central aperture for receipt of said central cylinder;

pedaling positions in said cockpit including at least one seat spaced from said axle such that a person sitting in said seat can use said pedals to move said axle; and paddle wheels coupled to opposite ends of said axle, each of said paddle wheels including vanes extending from a hub of said paddle wheel for propelling the paddle boat in the water, and an outer rim which circumscribes said vanes and provides a surface for contacting the ground, whereby said paddle wheels provide a propeller for the paddle boat in the water and a wheel for the paddle boat on land, said paddle wheels positioned on opposite sides of said longitudinal axis.

6. The paddle boat as defined in claim 5, further including a collar positioned in said cylinder, said axle extending through said collar.

7. The paddle boat as defined in claim 6, wherein said drip plate includes an upper lip.

8. The paddle boat as defined in claim 7, wherein said collar is constructed of nylon.

9. A paddle boat, comprising:

a hull, said hull having a longitudinal axis extending from the bow to the stern of the paddle boat, said hull having a deck and a bottom;

a cockpit defined by said deck;

an axle extending through said hull such that it extends into said cockpit;

pedals carried on said axle, said pedals positioned in said cockpit;

a sealing assembly extending through said hull and said deck, said axle extending through said sealing assembly;

pedaling positions in said cockpit including at least one seat spaced from said axle such that a person sitting in said seat can use said pedals to move said axle, said pedaling seat positions including a first seat positioned in front of said axle and a second seat positioned behind said axle, both of said first and second seats facing said axle such that people sitting in said first and second seats may use said pedals to move said axle to propel said wheels;

said pedals including a front face and a back face, said front and back faces angled toward one another such that the front and back faces are angled upwardly for use by people sitting in either of said seats;

paddle wheels coupled to opposite ends of said axle, each of said paddle wheels including vanes extending from a hub of said paddle wheel for propelling the paddle boat in the water, said vanes extending laterally from opposite sides of a planar portion of each said wheel, and an outer rim which circumscribes said vanes and provides a surface for contacting the ground, whereby said paddle wheels provide a propeller for the paddle boat in the water and a wheel for the paddle boat on land, said paddle wheels positioned on opposite sides of said longitudinal axis;

a storage compartment adjacent said cockpit, said compartment having sides and a bottom; and a rigid member movably supported on said hull such that it moves between a lowered position enclosing said compartment and a lifted position at least partially covering a person sitting in said cockpit.

* * * * *

UNITED STATES PATENT AND TRADEMARK OFFICE
CERTIFICATE OF CORRECTION

PATENT NO.   : 5,381,752
DATED        : January 17, 1995
INVENTOR(S)  : Donald Eerdmans It is certified that error appears in the above-indentified patent and that said Letters Patent is hereby corrected as shown below:

Column 2, line 28
"is front" should be --is a front--;

Column 2, line 46
"paddle" should be --paddle boat--;

Column 3, line 17
"FIGS. 1'13" should be --FIGS. 1-13--;

Column 3, line 32
"respectfully" should be --respectively--;

Column 4, line 25
"longitunal" should be --longitudinal;

Column 5, line 10
"or" should be --are--;

Column 5, line 13
"wait" should be --weight--;

Column 5, line 61
after "of" delete "a";

Column 6, line 23
"ruder 92" should be --rudder 220--;

Column 7, line 24
"46 positioned" should be --46 are positioned--;

UNITED STATES PATENT AND TRADEMARK OFFICE
CERTIFICATE OF CORRECTION

PATENT NO. : 5,381,752  Page 2 of 3
DATED : January 17, 1995
INVENTOR(S) : Donald Eerdmans It is certified that error appears in the above-indentified patent and that said Letters Patent is hereby corrected as shown below:

Column 7, line 60
After "58" insert --,--;

Column 6, line 34
"ruder" should be --rudder--;

Column 6, line 40
"ruder" should be --rudder--;

Column 6, line 41
"ruder" should be --rudder--;

Column 6, line 43
"ruder" should be --rudder-;

Column 6, line 53
"ruder" should be --rudder--;

Column 7, line 34
"ruder" should be --rudder--;

Column 7, line 43
"ruder" should be --rudder--;

Column 8, line 17
"stem" should be --stern--;

Column 9, line 2
"carded" should be --carried--;

UNITED STATES PATENT AND TRADEMARK OFFICE
CERTIFICATE OF CORRECTION

PATENT NO. : 5,381,752
DATED : January 17, 1995
INVENTOR(S) : Donald Eerdmans

It is certified that error appears in the above-indentified patent and that said Letters Patent is hereby corrected as shown below:

Column 9, line 11
    after "for" insert --contacting--;

Column 9, line 52
    "wheels" should be --wheel--;

Column 9, line 57
    after "axle;" delete "and"; and

Column 9, line 64
    after "feet;" insert --and--.

Signed and Sealed this

Ninth Day of January, 1996

Attest:

BRUCE LEHMAN

*Attesting Officer*       *Commissioner of Patents and Trademarks*